(12) United States Patent
Kawashima

(10) Patent No.: US 12,172,609 B2
(45) Date of Patent: Dec. 24, 2024

(54) WINDSHIELD WIPER CONNECTOR

(71) Applicant: Pylon Manufacturing Corporation, Deerfield Beach, FL (US)

(72) Inventor: Hiroshi Kawashima, Sunrise, FL (US)

(73) Assignee: Pylon Manufacturing Corporation, Deerfield Beach, FL (US)

( * ) Notice: Subject to any disclaimer, the term of this patent is extended or adjusted under 35 U.S.C. 154(b) by 236 days.

(21) Appl. No.: 17/401,189

(22) Filed: Aug. 12, 2021

(65) Prior Publication Data
US 2022/0048475 A1 Feb. 17, 2022

Related U.S. Application Data

(60) Provisional application No. 63/064,774, filed on Aug. 12, 2020.

(51) Int. Cl.
*B60S 1/40* (2006.01)

(52) U.S. Cl.
CPC ........... *B60S 1/4003* (2013.01); *B60S 1/4048* (2013.01); *B60S 1/4074* (2013.01); *B60S 2001/4051* (2013.01); *B60S 2001/4058* (2013.01); *B60S 2001/4061* (2013.01); *B60S 1/4067* (2013.01); *B60S 1/407* (2013.01); *B60S 1/4087* (2013.01)

(58) Field of Classification Search
CPC .... B60S 1/4045; B60S 1/4048; B60S 1/4003; B60S 1/4074; B60S 1/407; B60S 1/4067; B60S 1/4077; B60S 1/4016; B60S 2001/4058; B60S 2001/408; B60S 2001/4051; B60S 1/4061
USPC ........................................................ 15/250.32
See application file for complete search history.

(56) References Cited

U.S. PATENT DOCUMENTS

| | | | |
|---|---|---|---|
| 11,433,857 B2 | 9/2022 | Graham et al. | |
| 2013/0212825 A1* | 8/2013 | Lee | B60S 1/3867 15/250.32 |
| 2014/0215747 A1* | 8/2014 | Yang | B60S 1/4003 15/250.32 |
| 2017/0334406 A1* | 11/2017 | Kawashima | B60S 1/3851 |
| 2018/0186339 A1* | 7/2018 | Huang | B60S 1/4009 |
| 2019/0077375 A1* | 3/2019 | Goh | B60S 1/407 |

FOREIGN PATENT DOCUMENTS

| | | | |
|---|---|---|---|
| DE | 102012011225 | * | 5/2013 |
| FR | 2838693 | * | 10/2003 |

OTHER PUBLICATIONS

Machine language translation of description portion of German publication 102012011225, published May 2013. (Year: 2013).*

* cited by examiner

*Primary Examiner* — Gary K. Graham

(57) ABSTRACT

A windshield wiper connector is disclosed for connecting a variety of wiper arms with a wiper blade. The connector may include a pivotable cover. The connector may also include a pin passage for receiving a pin-type wiper arm as well as a gaps in the connector positioned around an elevated plateau for receiving a slot-type wiper arm.

9 Claims, 11 Drawing Sheets

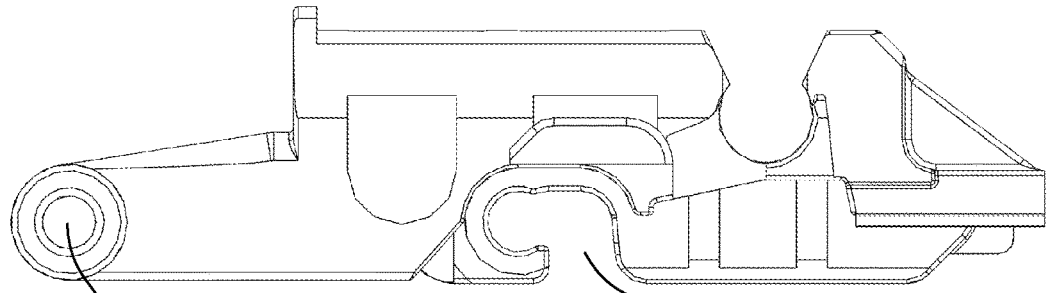
FIG. 11
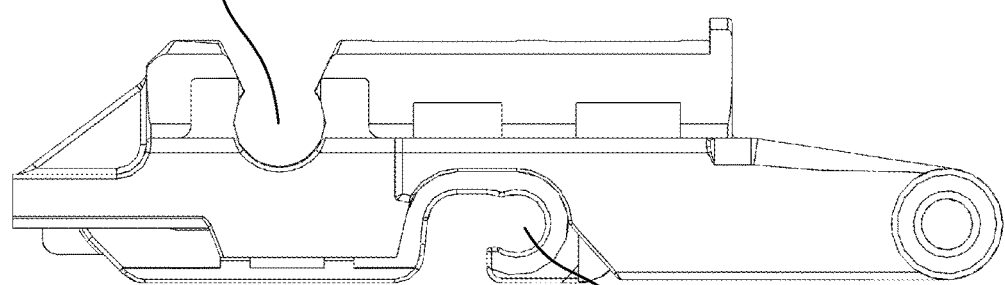
FIG. 12
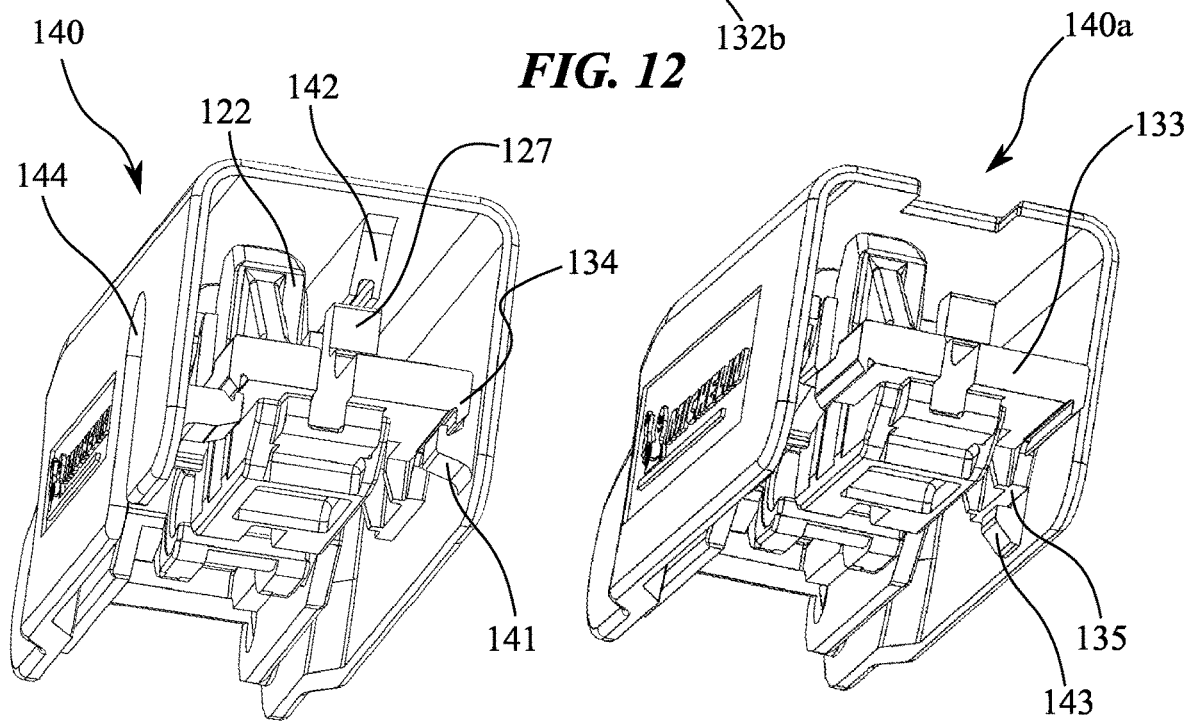
FIG. 13     FIG. 14

US 12,172,609 B2

WINDSHIELD WIPER CONNECTOR

CROSS REFERENCE TO RELATED APPLICATIONS

This application claims priority to U.S. Provisional Patent Application No. 63/064,774 filed Aug. 12, 2020, the entire contents of which are incorporated herein in their entirety.

TECHNICAL FIELD

This invention relates in general to windshield wipers, and more particularly, to an improved connector for a windshield wiper that allows the windshield wiper to be attached to multiple windshield wiper arm configurations. The invention is also directed to windshield wipers incorporating these novel connectors.

BACKGROUND OF THE INVENTION

There are a variety of wiper arms on which wiper blades are provided as original equipment. These various wiper arms have hooks, pins, or other configurations which may connect to the wiper blade with or without connectors. These various configurations have created a problem in the replacement market because wiper blade providers are required to have multiple wiper blade configurations to accommodate all of the existing wiper arms. It is therefore advantageous to have attachment structures that can accommodate a host of arms to reduce the complexity and cost associated with this problem.

The need to attach replacement windshield wiper blades to multiple arms has been addressed to some degree. For example, windshield wiper blades have been designed to work with various hook-type wiper arms having different sizes. Connectors may also be configured to receive either a pin-type arm or a hook arm. While these connectors may increase the usefulness of a given windshield wiper such that it can be used with different wiper arm types, the connectors are often expensive and have a complicated structure that is difficult and time-consuming to manufacture Thus, there is a need for inexpensive connectors that are capable of securing a windshield wiper blade to a variety of arms. In particular, it would be desirable to have a connector that can be attached to a wiper blade that will allow the wiper blade to be locked to a wide variety of wiper arms despite their various locking mechanisms. It would also be desirable to have a windshield wiper connector that can be fabricated or molded as a single piece at low-cost. The prior art fails to provide a low-cost windshield wiper connector capable of attachment to a wide variety of windshield wiper arms, much less for the purpose of reducing the amounts of inventory parts required to supply a vehicle market that uses a wide variety of windshield wiper arm types.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In one embodiment of the invention, a windshield wiper connector assembly may include a connector having a proximal end and a distal end at opposing longitudinal ends of the wiper blade connector, and a top side and a bottom side at opposing vertical ends of the wiper blade connector. The connector may include a rivet clip open at the bottom side of the connector. The connector may also include an elevated plateau provided at the top side of the connector, the plateau including an inner side wall and an outer side wall on opposing lateral sides of the plateau. The connector may further include a pin cutout provided within the plateau. The connector may include a pair of first slot openings at the top side of the connector, each of the first slot openings provided on either lateral side of the plateau.

In another embodiment, a windshield wiper connector assembly may include a connector having a proximal end and a distal end at opposing longitudinal ends of the wiper blade connector, and a top side and a bottom side at opposing vertical ends of the wiper blade connector. The connector assembly may also include a connector cover pivotably connected with the connector near the proximal end, the cover pivotable between an open and closed position. The cover may include a pair of cover side walls, a cutout in one of the side walls with the cutout beginning at a bottom side of the cover and extending towards a top side of the cover, and an inner cover clip inwardly projecting from a cover side wall for engaging the wiper blade connector at or near its distal end as the cover is in the closed position.

BRIEF DESCRIPTION OF THE DRAWINGS

FIG. 11 is a side view of the connector of FIG. 1 with the cover removed.

FIG. 12 is an opposing side view of the connector of FIG. 1 with the cover removed.

FIG. 13 is a reverse bottom perspective view of the connector of FIG. 1.

FIG. 14 is a reverse bottom perspective view of the connector of FIG. 1 with an alternative embodiment of a cover.

DETAILED DESCRIPTION OF THE DISCLOSURE

Figure 1:
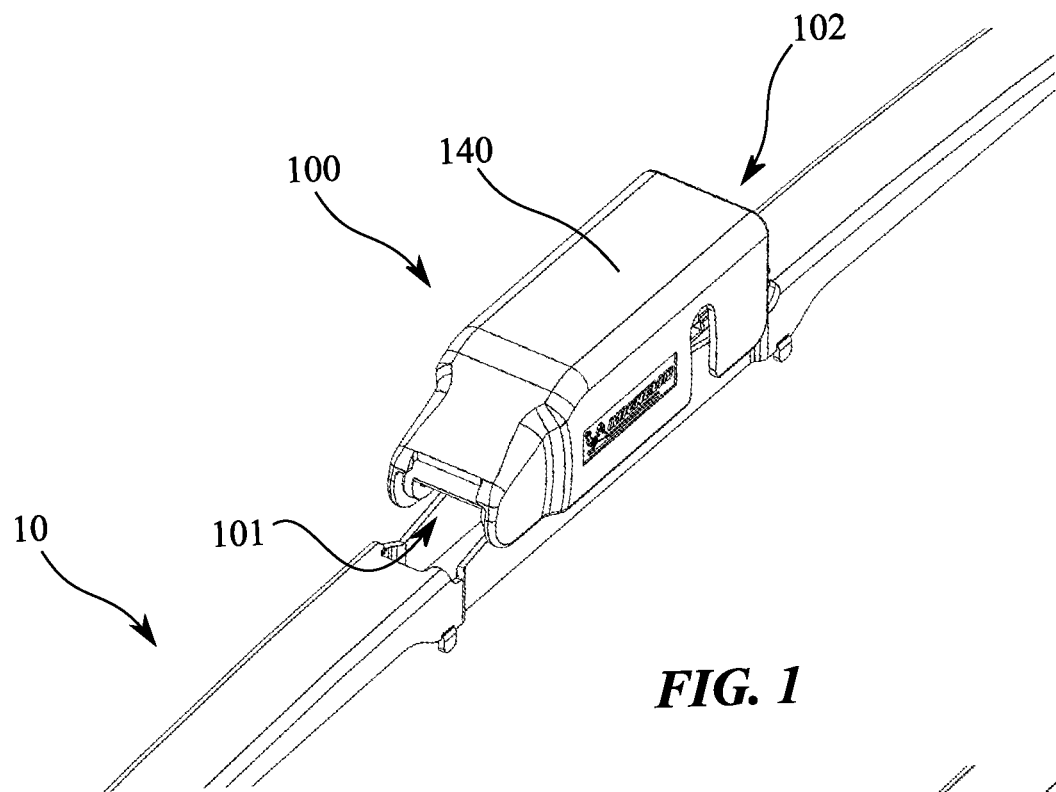
FIG. 1 is a top perspective view of an embodiment of a connector connected with a frame of a wiper blade.

The following detailed description and the appended drawings describe and illustrate exemplary embodiments solely for the purpose of enabling one of ordinary skill in the relevant art to make and use the invention. As such, the detailed description and illustration of these embodiments are purely exemplary in nature and are in no way intended to limit the scope of the invention, or its protection, in any manner. It should also be understood that the drawings are not to scale and in certain instances details have been omitted, which are not necessary for an understanding of the present invention, such as conventional details of fabrication and assembly.

In one embodiment of the invention, a windshield wiper connector assembly may include a connector having a proximal end and a distal end at opposing longitudinal ends of the wiper blade connector, and a top side and a bottom side at opposing vertical ends of the wiper blade connector. The connector may include a rivet clip open at the bottom side of the connector. The connector may also include an elevated plateau provided at the top side of the connector, the plateau including an inner side wall and an outer side wall on opposing lateral sides of the plateau. The connector may further include a pin cutout provided within the plateau. The connector may include a pair of first slot openings at the top side of the connector, each of the first slot openings provided on either lateral side of the plateau.

In additional embodiments, the connector may include a pair of second slot openings at the top side of the connector, each of the second slot openings provided on either lateral side of the plateau, the pair of first slot openings and the pair of second slot openings longitudinal spaced from each other. The pin cutout may be positioned between the plateau and the proximal end, the first slot openings are positioned between the second slot openings and the pin passage, and the second slot openings are positioned between the distal end and the first slot openings. The connector may include a pin clip projecting from the top side of the connector and laterally adjacent the pin cutout, the pin clip and the pin cutout together defining a pin passage. The first pair of slot openings may be provided laterally adjacent the pin cutout, with one of the first slot openings between the pin cutout and the pin clip. The connector may include a slot arm ledge provided on the outer side wall of the plateau. The inner side wall of the plateau may partially define one of the second slot openings. The inner side wall of the plateau may partially define one of the first slot openings. The pin cutout may be open at the top side.

In further embodiments, the connector assembly may include a cover pivotably connected with the connector near the proximal end, the cover pivotable between an open and closed position. The connector may include a distal platform near the distal end, and the cover includes an inner clip for engaging the distal platform as the cover is in the closed position. The cover may include a pin slot in a side wall of the cover, the pin slot aligned with the pin cutout as the cover is in the closed position. The connector may include a pin clip projecting from the top side of the connector and laterally adjacent the pin cutout, the pin clip and the pin cutout together defining a pin passage, and wherein the cover includes an underside projection that projects downward from the cover and contacts the pin cutout as the cover is in the closed position. The cover further includes an inner ledge that engages the slot arm ledge as the cover is in the closed position.

In another embodiment, a windshield wiper connector assembly may include a connector having a proximal end and a distal end at opposing longitudinal ends of the wiper blade connector, and a top side and a bottom side at opposing vertical ends of the wiper blade connector. The connector assembly may also include a connector cover pivotably connected with the connector near the proximal end, the cover pivotable between an open and closed position. The cover may include a pair of cover side walls, a cutout in one of the side walls with the cutout beginning at a bottom side of the cover and extending towards a top side of the cover, and an inner cover clip inwardly projecting from a cover side wall for engaging the wiper blade connector at or near its distal end as the cover is in the closed position. The cover may include additional cutout in the other side wall of the pair of cover side walls, the additional cutout positioned laterally across from the cutout. The cover may include a pair of wells each projecting outwardly from a cover side wall of the pair of cover side walls, each well positioned laterally across from the other, and each well positioned longitudinally between the inner cover clip and the cutout In some embodiments the connector may be fabricated as a single piece.

In addition, the connector is configured such that the orientation of either the windshield wiper or the connector can be reversed based on the particular windshield wiper arm that is being used.

Figure 2:
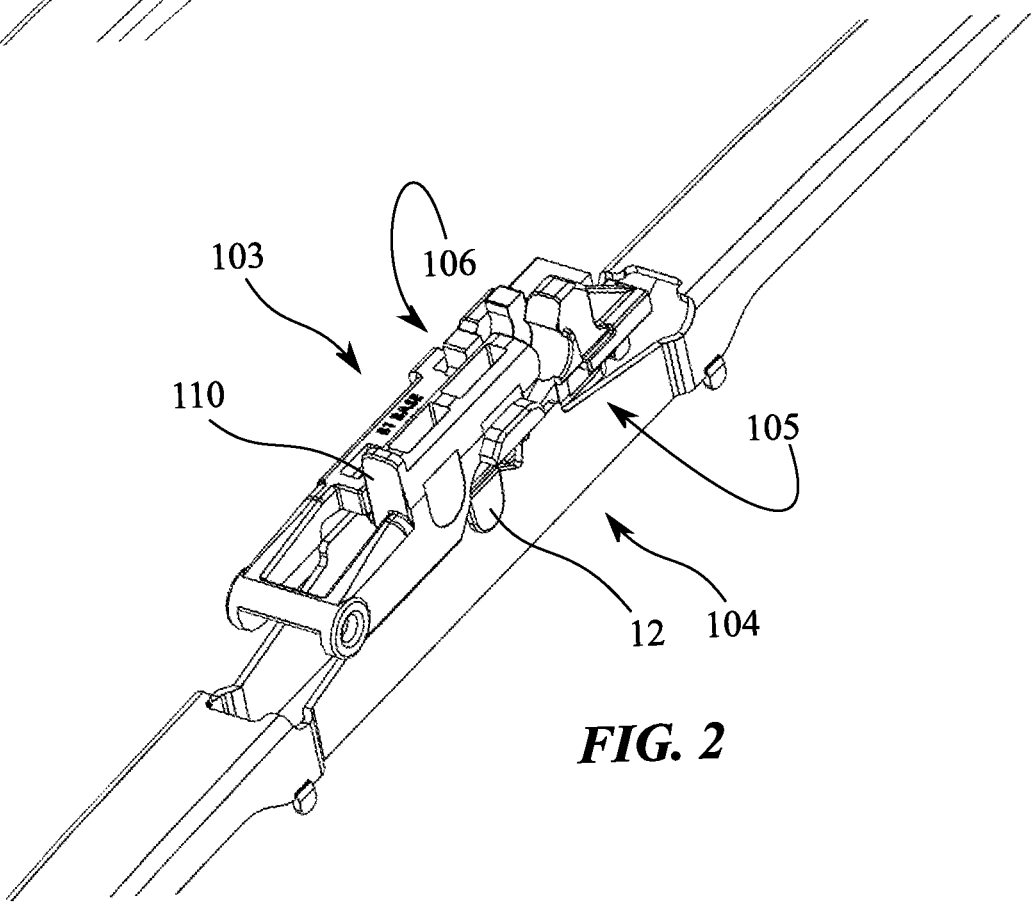
FIG. 2 is a top perspective view of the connector connected with a frame of a wiper blade of FIG. 1, with the cover removed.
Figure 3:
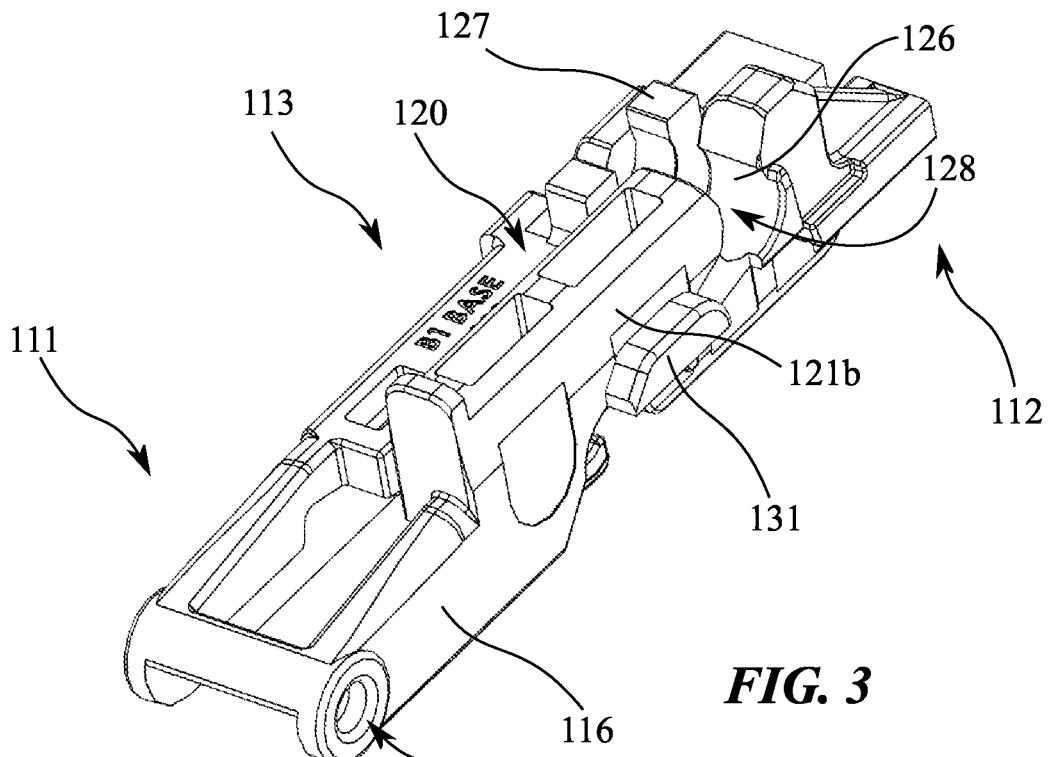
FIG. 3 is a top perspective view of the connector of FIG. 1 with the cover removed.
Figure 4:
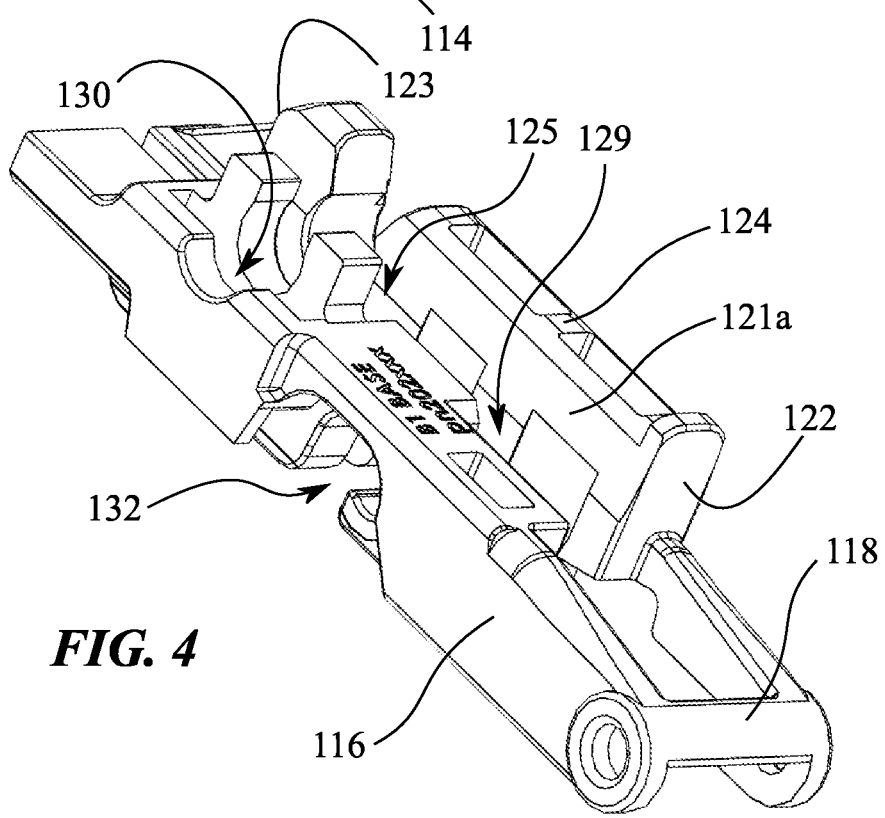
FIG. 4 is a reverse top perspective view of the connector of FIG. 1 with the cover removed.
Figure 5:
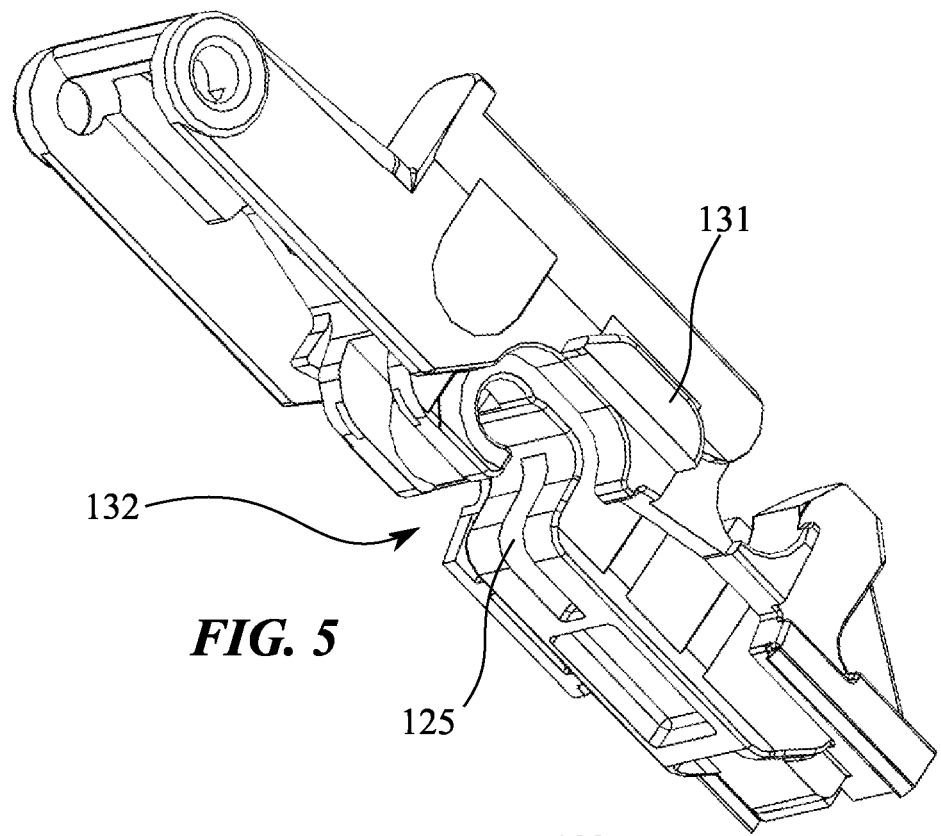
FIG. 5 is a bottom perspective view of the connector of FIG. 1 with the cover removed.
Figure 6:
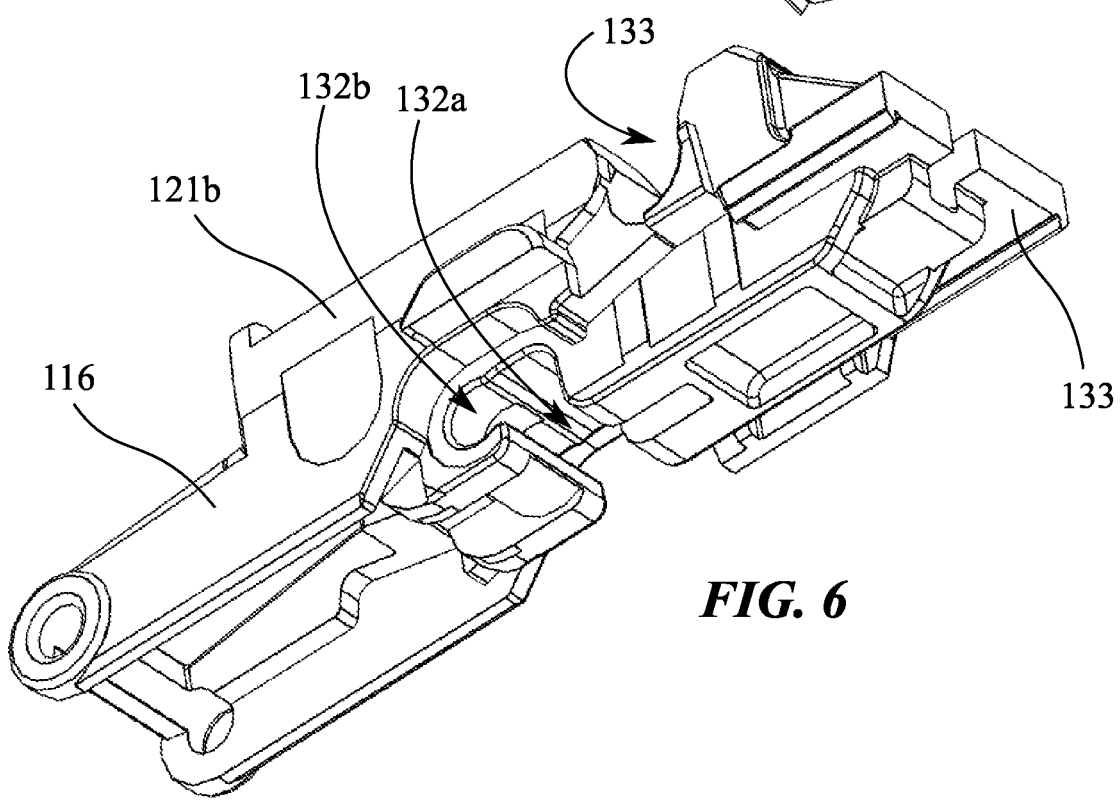
FIG. 6 is a reverse bottom perspective view of the connector of FIG. 1 with the cover removed.
Figure 7:
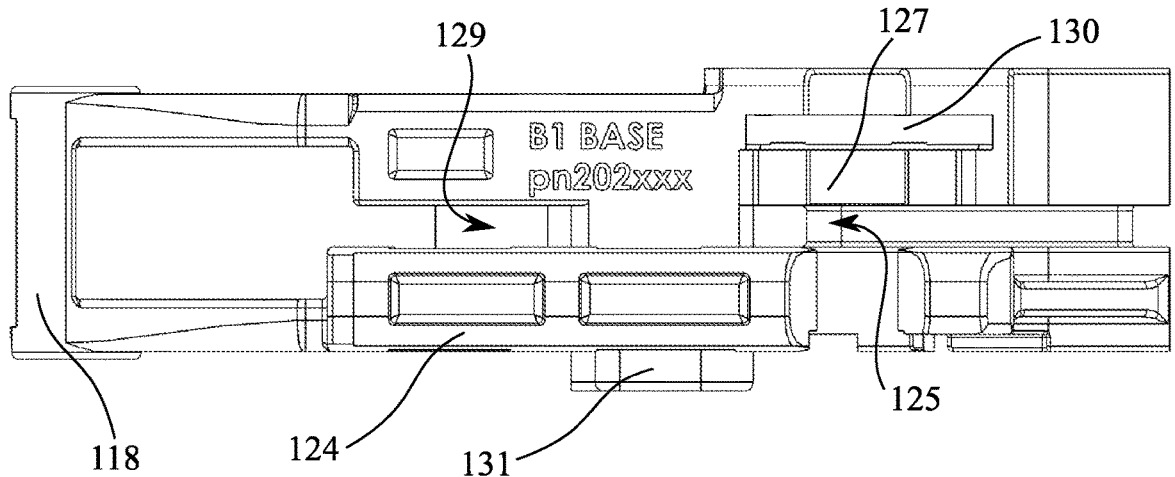
FIG. 7 is a top view of the connector of FIG. 1 with the cover removed.
Figure 8:
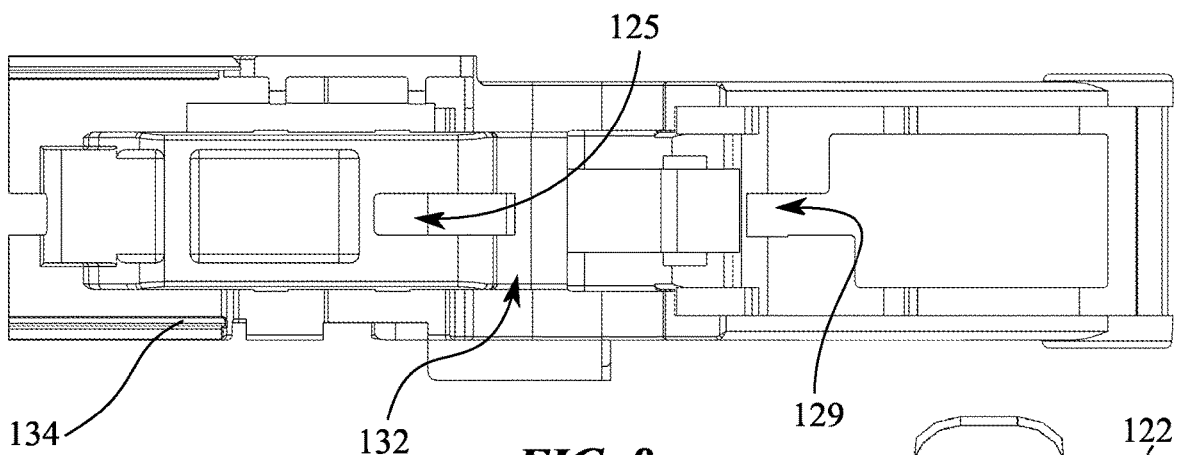
FIG. 8 is a bottom view of the connector of FIG. 1 with the cover removed.
Figures 9, 10:
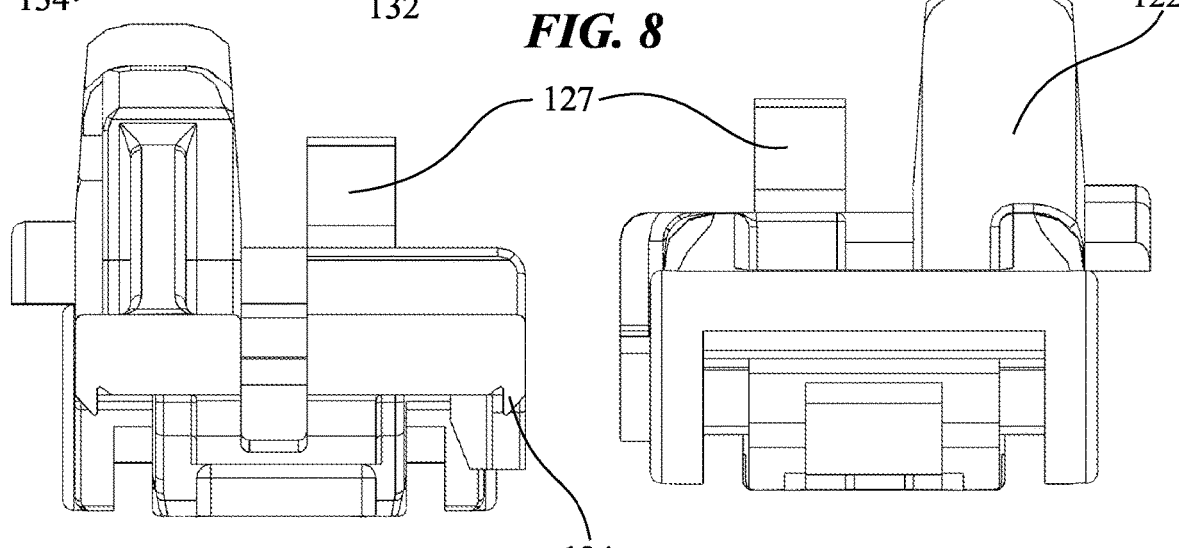
FIG. 9 is a distal end view of the connector of FIG. 1 with the cover removed.
FIG. 10 is a proximal end view of the connector of FIG. 1 with the cover removed.
Figure 15:
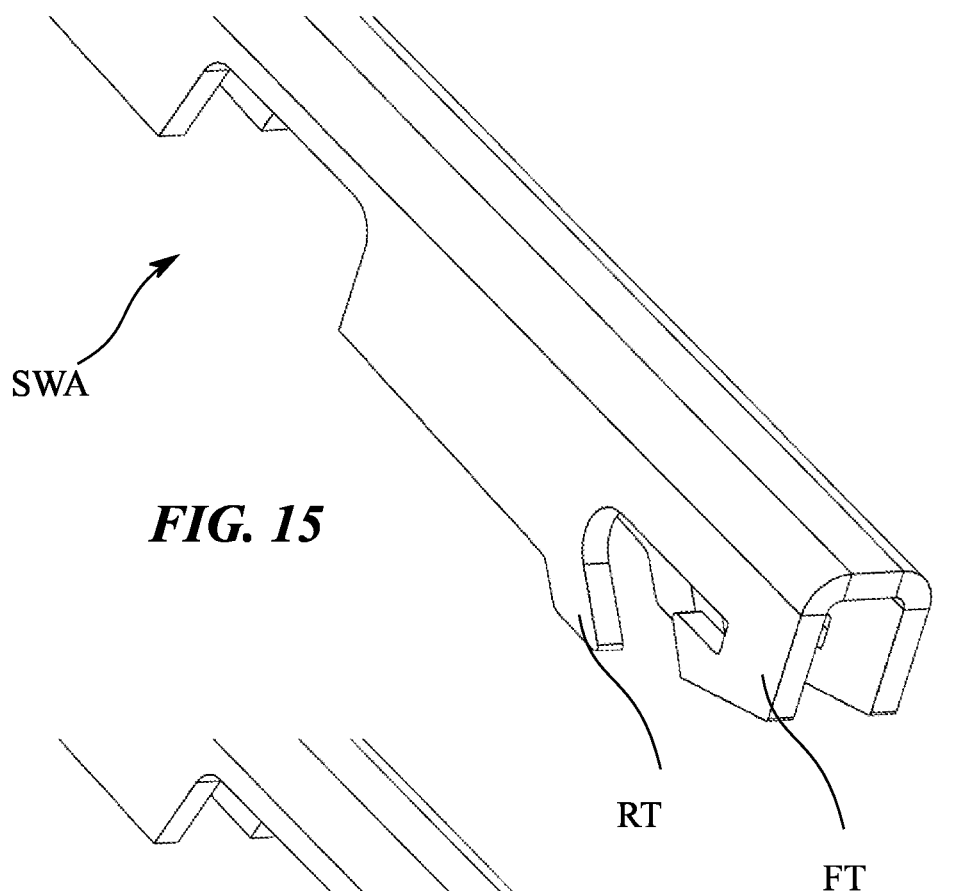
FIG. 15 is a top perspective view of a slot-type wiper arm.
Figure 16:
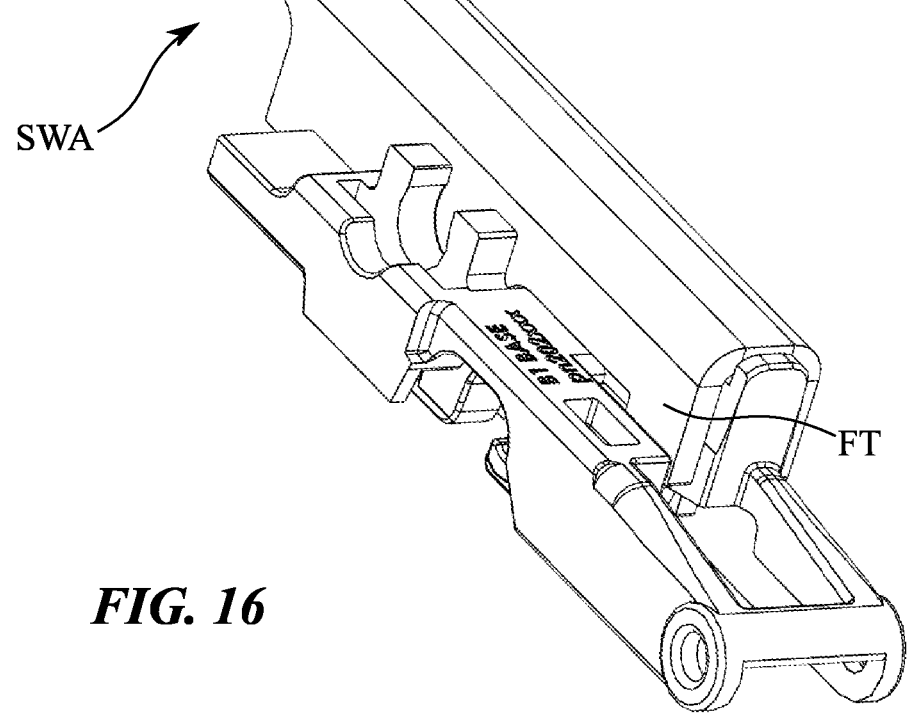
FIG. 16 is a top perspective view of a slot-type wiper arm connected with the connector of FIG. 1 with the cover removed.
Figure 17:
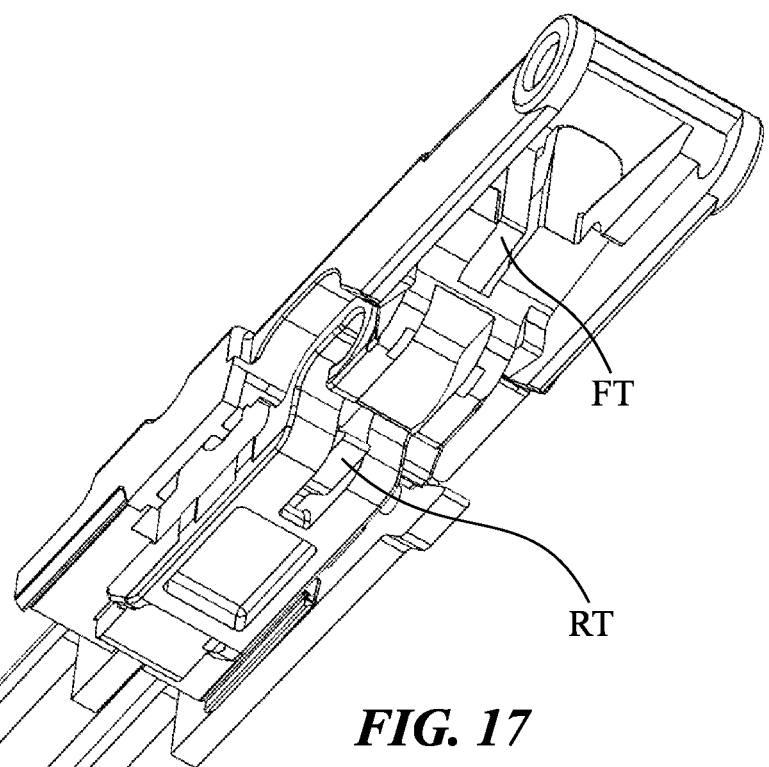
FIG. 17 is a bottom perspective view of a slot-type wiper arm connected with the connector of FIG. 1 with the cover removed.
Figure 18:
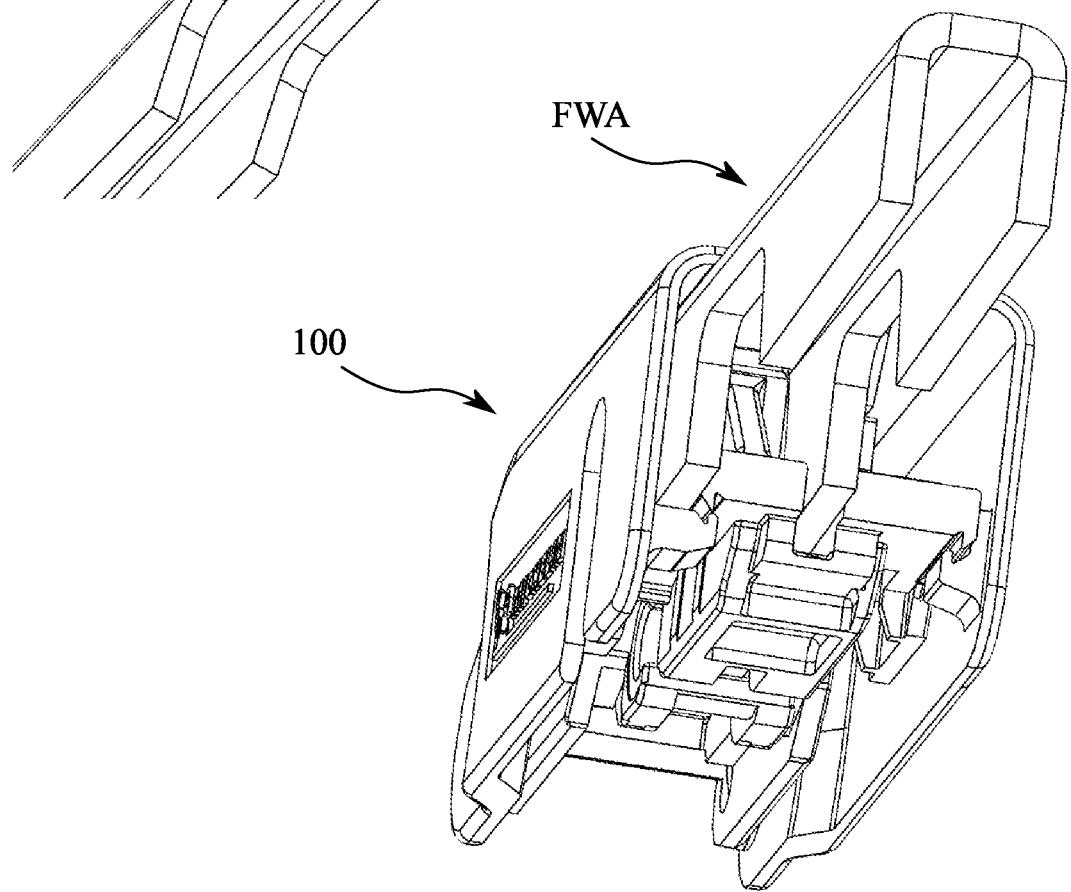
FIG. 18 is a reverse bottom perspective view of a slot type wiper arm connected with the connector of FIG. 1.
Figure 19:
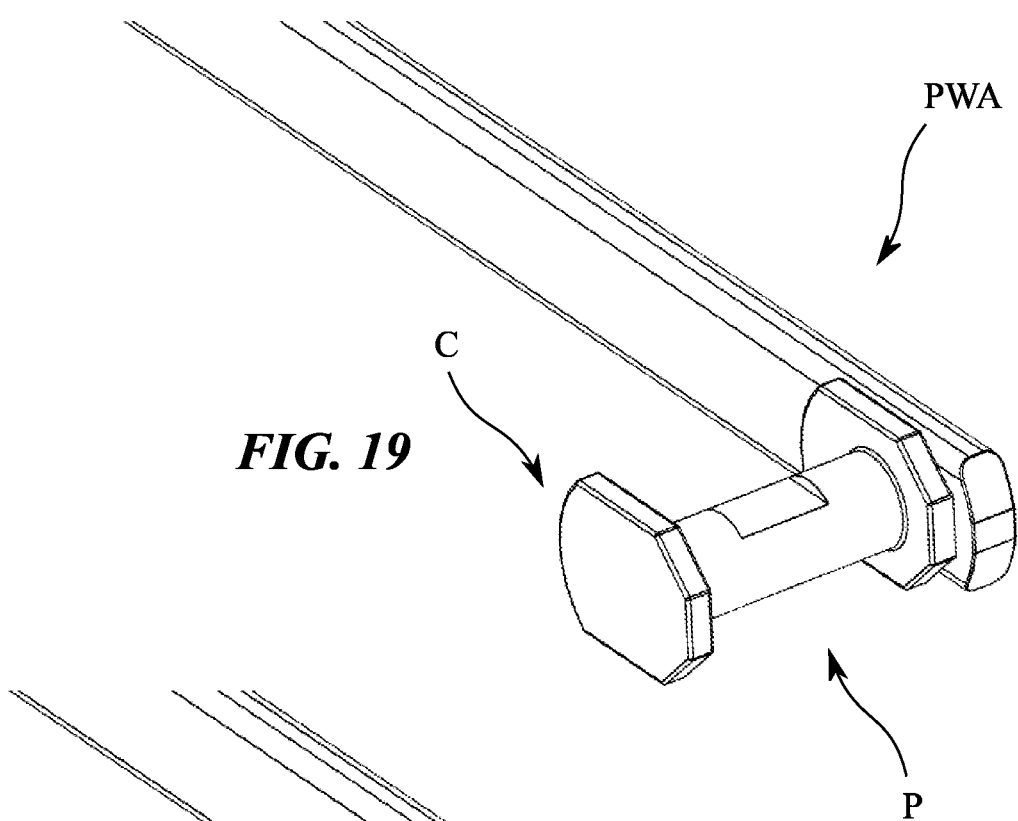
FIG. 19 is a top perspective view of a pin-type wiper arm.
Figure 20:
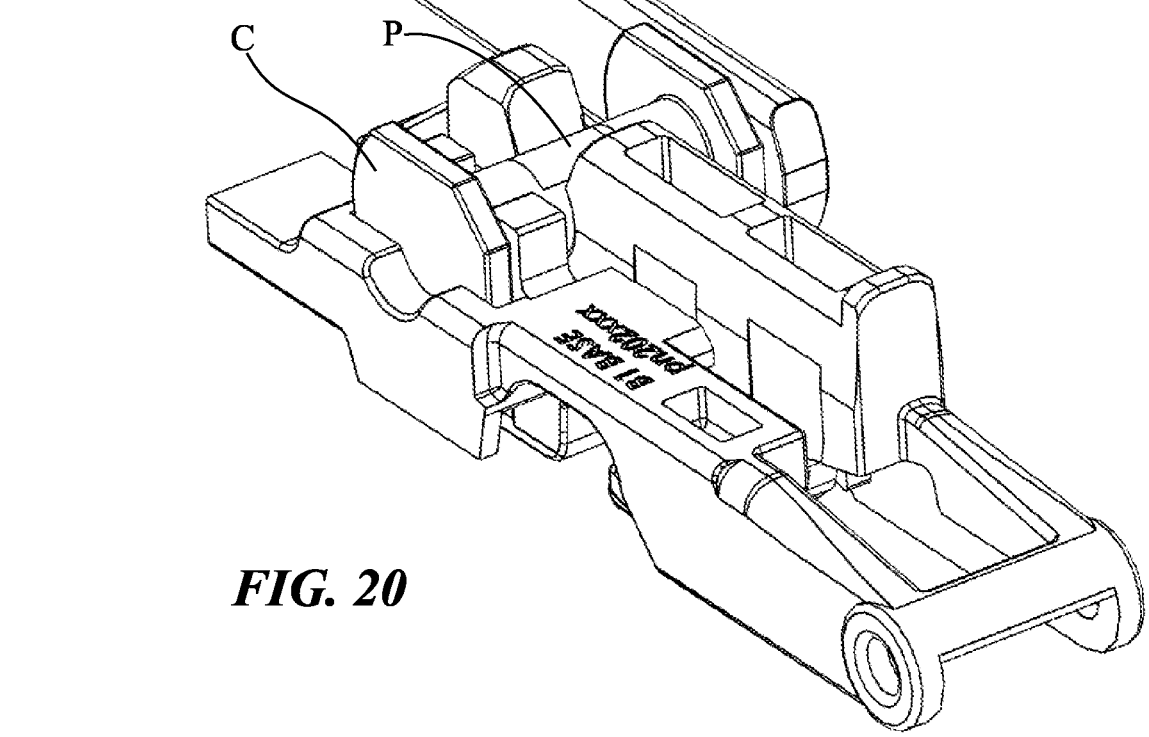
FIG. 20 is a top perspective view of a pin-type wiper arm connected with the connector of FIG. 1 with the cover removed.
Figures 21, 22:
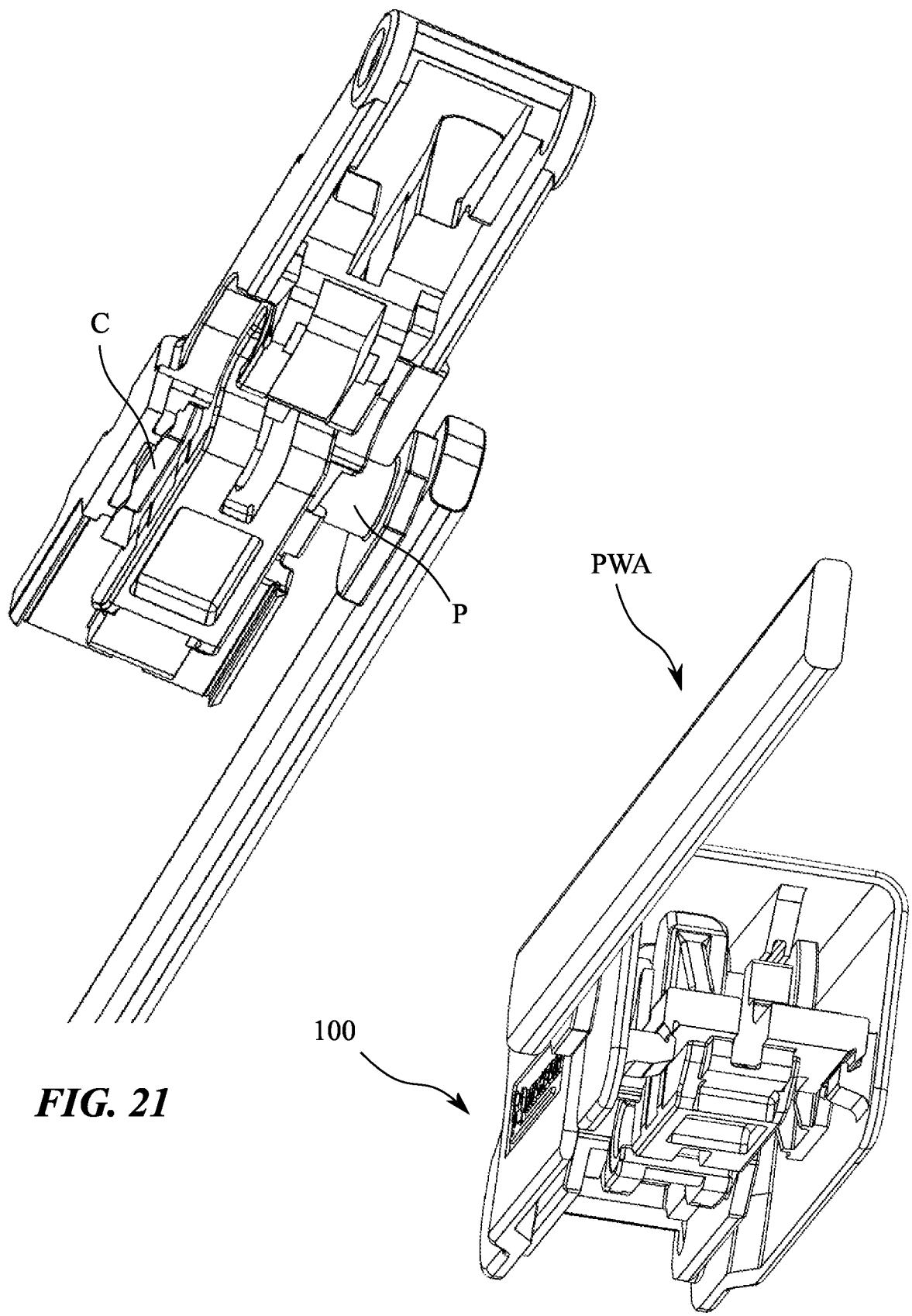
FIG. 21 is a bottom perspective view of a pin-type wiper arm connected with the connector of FIG. 1 with the cover removed.
FIG. 22 is a reverse bottom perspective view of a pin-type wiper arm connected with the connector of FIG. 1.
Figure 23:
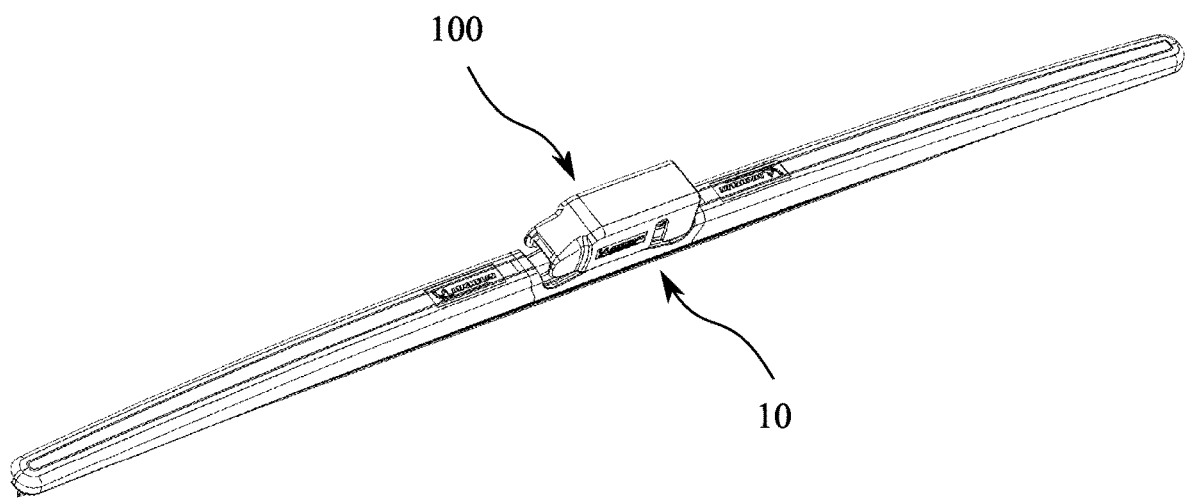
FIG. 23 is a top perspective view of an embodiment of a connector connected with a wiper blade.

FIGS. 1, 2, and 23 are top perspective views of an embodiment of a connector 100 of the disclosure connected with the frame or support structure of a wiper blade 10. The connector has a proximal end 101 and a distal end 102 longitudinally opposite the proximal end. The connector further has a top side 103 and a bottom side 104 that is opposite the bottom side, with the bottom side defined as the side proximate the wiper blade 10 when connector 100 is connected with the support structure. The connector may also have a first side 105 and a laterally opposite second side 106.

The connector may include a base 110 and a cover or cap 140. A rivet 12 may be provided on the frame of wiper blade 10, which connector 100, and more particularly base 110, connects with as described herein. Cover 140 may be pivotable with respect to base 110 between an open and closed position as described herein. Embodiments of a wiper blade having this frame or support structure, including a rivet, are disclosed in FIGS. 190 through 199 in Applicant's U.S. application Ser. No. 16/344,310 filed Apr. 23, 2019, and the entire contents of said application are herein incorporated by reference.

With reference to FIGS. 3 through 14, the connector base 110 may be defined as generally having a proximal portion 111, a distal portion 112, and a central portion 113 between the proximal and distal portions. Proximal portion 111 may include a cover connector holes 114 for engaging internal projections on cover 140. A cover pivot axis may defined as extending between the cover connector holes 114, and cover 140 pivot along the cover pivot axis with respect to base 110. Cover connector holes 114 may be provided within base side walls 116 are at the lateral perimeters of base 110 on the first and second sides 105, 106. Cover connectors holes 114 may also include a proximal connector hole bridge 118 between the side walls 116.

Central portion 113 may include an elevated plateau 120 that is above base 110 in the direction towards top side 103. Plateau 120 may include laterally opposed plateau side walls 121, a plateau proximal wall 122 defined as the wall facing proximal end 101, a plateau distal wall 123 defined as the wall facing proximal end 102, and a plateau top surface 124 defined as the surface facing top side 103. Plateau side walls 121 may include an inner plateau side wall 121a and an outer plateau side wall 121b, with the outer plateau side wall constituting a portion of side wall 116. Plateau proximal wall 122 may extend or project above plateau top surface 124 so as to contact or engage with cover 140 when the cover is in the closed position and ensure a clearance space between cover 140 and a connected wiper arm.

A pin cutout 126 may be provided within central plateau 120 proximate the distal end of the plateau. Laterally aligned with pin cutout 126 may be a pin clip 127 projecting upwards from base 110 towards top side 103, and the pin cutout 126 and pin clip 127 may together define a pin passage 128 for receiving a pin of a wiper arm as disclosed herein. Pin passage 128 may be open at the top side 103 to receive the wiper arm pin being snap fit into the pin passage from the top side.

A distal slot arm opening 125 may be provided between pin cutout 126 and pin clip 127. Distal slot arm opening may extend between the top side and bottom side of base 110 and be dimensioned to receive a rear tooth of a slot arm type wiper arm as disclosed herein. A pin cover recess or opening 130 may be provided in base 110 on the laterally opposite side of pin clip 127 from the proximal slot arm opening 125. Pin cover opening 130 may be aligned with the pin channel 128 and dimensioned to receive a portion or edge of a pin cover of a pin type wiper arm as disclosed herein. Pin cover opening or recess 130 may extend entirely through base 110 or through just a portion of base 110 sufficiently deep so as to permit the pin cover to rest therewithin when the pin is locked into pin passage 128. A proximal slot arm opening 129 may be longitudinally aligned with distal slot arm opening 125 and, like the distal slot arm opening, may extend through base 110. Slot arm openings 125, 129 may be adjacent plateau 120 such that inner plateau side wall 121a may partially define each of the slot arm openings 125, 129. Proximal slot arm opening be dimensioned to receive a forward tooth of a slot arm type wiper arm. A slot arm ledge 131 may be provided on outer plateau side wall 121b, and slot arm ledge 131 may be longitudinally positioned between slot arm openings 125, 129 on the other lateral side of plateau of 120.

On the bottom side 104 of base 110, a rivet clip 132 may be provided to receive rivet 12 from wiper arm 10. Rivet clip 131 may be positioned between slot arm openings 125, 129 so as to hold rivet 12 without interference from the distal ends of the forward and rear teeth of a connected slot type wiper arm. Rivet clip 132 may have an entry portion 131a for receiving rivet 12 and a longitudinally offset portion 132b for holding rivet 12. Entry portion 131a may be open across the bottom side of connector 100 between each lateral side of the connector. Distal slot arm opening 125 may terminate within entry portion 132a, such that a received forward rear tooth extends into rivet clip entry portion 132a, which would still not interfere with rivet 12 held in rivet clip offset portion 132b. The offset rivet clip 132b may be arcuate to accommodate a snap fit connection with rivet 12. Accordingly, a rivet 12 may move through, and be secured within, rivet clip 132 by entering at the rivet clip entry portion 132a and moving upwards from the bottom side 104 of the connector towards the top side 103 of the connector. The rivet 12 may then be redirected laterally towards rivet clip offset portion 132b as it contacts a curved, internal surface of rivet clip entry portion 132a. As rivet 12 contacts the curved, internal surface it moves in the longitudinal direction until reaching the offset clip 132b. The offset clip 132b may be positioned in a direction away from pin passage 128. This offset displacement of rivet clip 132b may further secure rivet 12 with connector 100 by limiting the likelihood that the rivet 12 may be dislodged from an upward force during operation of the wiper blade.

Distal portion 112 may include a distal platform 133 with underside platform projections 134 on the lateral edges of the distal platform. Underside platform projections 134 may engage inner cover clips 141 projecting from the inner side of cover 140. Inner cover clips 141 may have resilient ends that snap around underside platform projections 134 as cover 140 is closed. An underside cover projection 142 may also project downward from an underside cover surface of cover 140. In the closed position, underside cover projection may contact the top edge of pin clip 127. Another embodiment of cover 140a shows an inner ledge 143 that can snap fit around an underside central ledge 135 of base 110 positioned the lateral edge of central portion 113 at approximately the same longitudinal position as slot arm ledge 131, however on the opposite side wall 116. An arm cutout 144 may be provided on embodiments of the connector cover in order to allow structure from the wiper arm to engage with connector 100 as disclosed herein.

Referring now to FIGS. 15-22, it should be appreciated that the same connector 100 can be used with differing windshield wiper arms, namely a pin-type arm and a slot-type arm. This allows a reduced inventory that can satisfy the needs of a larger number of windshield wiper arm types.

FIGS. 15-18 show an embodiment of a slot-type wiper arm SWA connected with connector 100. Slot-type wiper arm has forward teeth FT and rear teeth RT that fit around plateau side walls 121, with the inner forward teeth extending into proximal slot opening 129 and inner rear teeth extending into distal slot opening 125. An underside of slot-type wiper arm rests on top plateau surface 124.

FIGS. 19-22 show an embodiment of a pin-type wiper arm PWA connected with connector 100. Pin-type wiper arm has laterally projecting pin P and, in some embodiments, an pin end cover C. Pin may snapfit into pin channel 128. A pin window 144 may be provided on the side of cover 140 to permit the cover to go into the closed position without interference from the pin.

Figure 24:
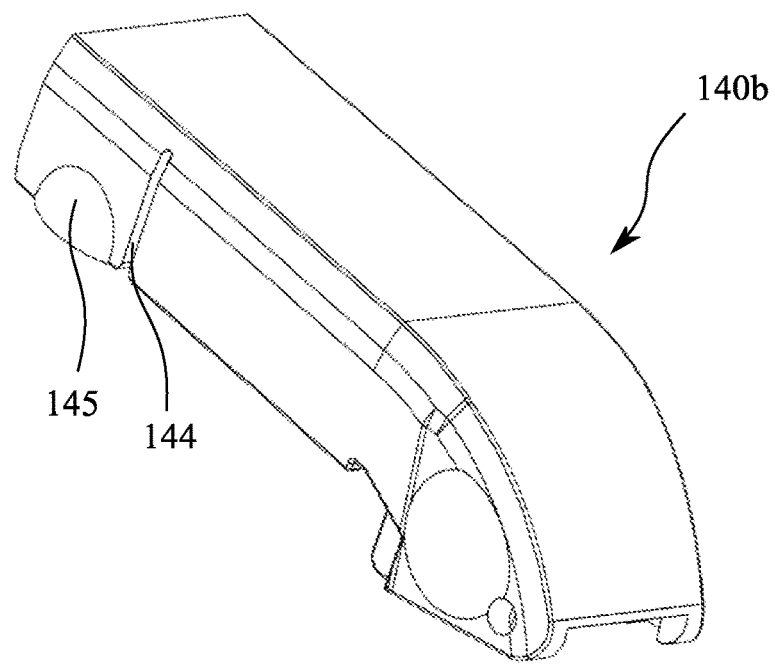
FIG. 24 is a top perspective view of an embodiment of a cover for use with embodiments of connector in accordance with the disclosure.
Figure 25:
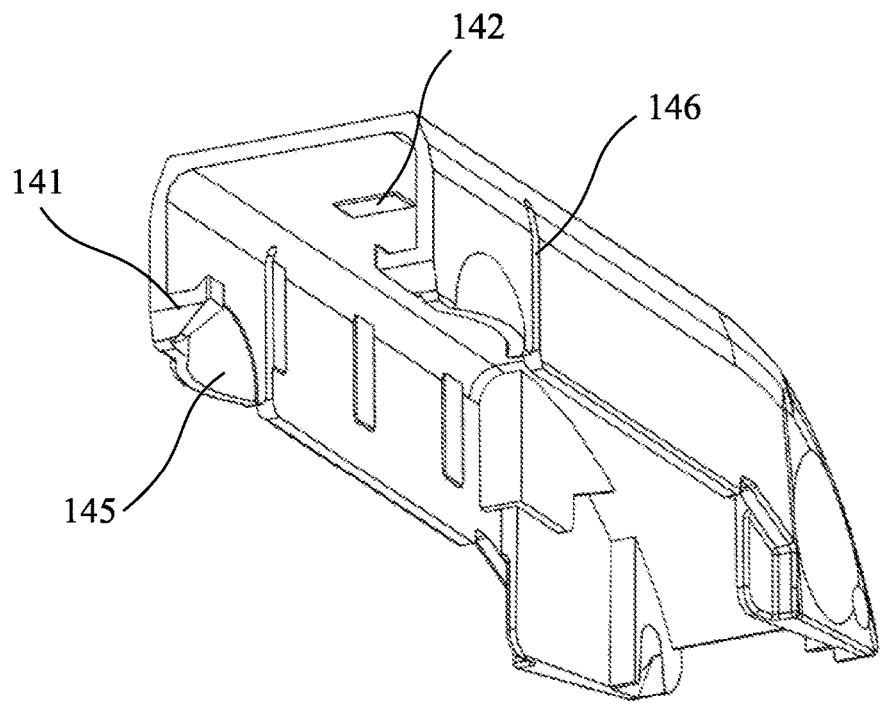
FIG. 25 is a reverse bottom perspective view of the cover of FIG. 24.

FIGS. 24-25 show an additional embodiment of a connector cover 140b for use with embodiments of connectors 100 disclosed herein. Arm cutouts 146 may be provided on one or both sides of cover 140 to facilitate lateral movement of the rear portion of the cover 140b. One or more wells 145 may also be provided proximate inner clips 141 to facilitate opening of the cover 140 by serving as grips for a user's fingers to manipulate laterally. Wells 145 may be half spherical, hollow projections from sides of cover 140. In embodiments having pin window 144 on one side of the cover 140, an arm cutout 146 may be provided opposite the pin window 144.

In operation, embodiments of the windshield wiper connector 1, 100 disclosed allows a single windshield wiper to be used in conjunction with a wide variety of windshield wiper arms. This reduces manufacturing cost, inventory cost, and provides for easy replacement of windshield wipers as needed.

Those skilled in the art will recognize that connector 100 can be fabricated from any suitable material known in the art, including without limitation, rigid or elastic plastics, metals, synthetic and natural rubber compounds, etc. However, certain embodiments contemplate materials that can be molded such that connector 100 is fabricated as a single piece. In addition, the connector 100 is configured such that the orientation of either the windshield wiper or the connector can be reversed based on the particular windshield wiper arm that is being used.

In certain embodiments, the connector 100 may be connected to the wiper blade prior to connecting to the wiper arm. In certain embodiments, the connector 100 may be connected to the wiper arm prior to being connected to the wiper blade. In certain embodiments, the connector 100 may either be first connected to the wiper arm or to the wiper arm.

Those skilled in the art will recognize that while the invention will most likely be used in conjunction with automobiles, it is suitable for use with any vehicle. For example, in addition to automobiles, trucks, buses, locomotives, aircrafts, or any other vehicle type that uses a windshield wiper can benefit from the invention.

While specific embodiments have been discussed to illustrate the invention, it will be understood by those skilled in the art that the descriptions herein are intended as illustrative, and not as limiting, and that variations in the embodiments can be made without departing from the spirit of the invention.

For example, any suitable material can be used to manufacture the connector. The number or position of the retaining pin apertures, locking apertures, or other mechanisms can vary so long as they are capable of performing their intended function.

What is claimed:

1. A wiper blade connector assembly for connecting a wiper blade support structure with a wiper arm, the connector assembly comprising:
    a wiper blade connector having a proximal end and a distal end at opposing longitudinal ends of the wiper blade connector, and a top side and a bottom side at opposing vertical ends of the wiper blade connector, the wiper blade connector including:
    a rivet clip open at the bottom side of the connector;
    an elevated plateau provided at the top side of the connector, the plateau including an inner side wall and an outer side wall on opposing lateral sides of the plateau;
    a pin cutout provided within the plateau; and
    a pair of slot openings at the top side of the connector, each of the slot openings provided on either inner side wall of the plateau;
    a pin clip projecting from the top side of the connector and laterally adjacent the pin cutout, the pin clip and the pin cutout together defining a pin passage;
    a pin cover opening provided laterally adjacent the pin clip opposite one of the first slot openings between the pin coutout and the pin clip; and
    wherein the pair of slot openings are provided laterally adjacent the pin cutout, with one of the slot openings between the pin cutout and the pin clip.

2. The connector assembly of claim 1, wherein the connector further includes a slot arm ledge provided on the outer side wall of the plateau.

3. The connector assembly of claim 2, further comprising a cover pivotably connected with the connector near the proximal end, the cover pivotable between an open and closed position, and wherein the cover further includes an inner ledge that engages the slot arm ledge as the cover is in the closed position.

4. The connector assembly of claim 1, wherein the pin cutout is open at the top side.

5. The connector assembly of claim 1 further comprising a cover pivotably connected with the connector near the proximal end, the cover pivotable between an open and closed position.

6. The connector assembly of claim 5, wherein the connector further includes a distal platform near the distal end, and the cover includes an inner clip for engaging the distal platform as the cover is in the closed position.

7. The connector assembly of claim 5, wherein the cover includes a pin slot in a side wall of the cover, the pin slot aligned with the pin cutout as the cover is in the closed position.

8. The connector assembly of claim 5, wherein the connector further includes a pin clip projecting from the top side of the connector and laterally adjacent the pin cutout, the pin clip and the pin cutout together defining a pin passage, and wherein the cover includes an underside projection that projects downward from the cover and contacts the pin cutout as the cover is in the closed position.

9. A wiper blade connector assembly for connecting a wiper blade support structure with a wiper arm, the connector assembly comprising:
    a wiper blade connector having a proximal end and a distal end at opposing longitudinal ends of the wiper blade connector, and a top side and a bottom side at opposing vertical ends of the wiper blade connector, the wiper blade connector including:
    a rivet clip open at the bottom side of the connector;
    an elevated plateau provided at the top side of the connector, the plateau including an inner side wall and an outer side wall on opposing lateral sides of the plateau;
    a pin cutout provided within the plateau; and
    a pair of slot openings at the top side of the connector, each of the slot openings provided on a lateral side of the plateau; and
    a cover pivotably connected with the connector near the proximal end, the cover pivotable between an open and closed position, wherein the cover includes a pin slot aligned with the pin cutout as the cover is in the closed position.

* * * * *